United States Patent
Chang et al.

(10) Patent No.: US 11,138,037 B2
(45) Date of Patent: Oct. 5, 2021

(54) SWITCH POLICY FOR HYBRID SCHEDULING IN MULTI-PROCESSOR SYSTEMS

(71) Applicant: MediaTek Inc., Hsinchu (TW)

(72) Inventors: Ya-Ting Chang, Hsinchu (TW); Chien-Hao Chiang, Hsinchu (TW); Ting-Chang Huang, Hsinchu (TW); Jing-Ting Wu, Hsinchu (TW); Jia-Ming Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 185 days.

(21) Appl. No.: 16/168,407

(22) Filed: Oct. 23, 2018

(65) Prior Publication Data
US 2019/0129752 A1 May 2, 2019

Related U.S. Application Data

(60) Provisional application No. 62/580,502, filed on Nov. 2, 2017.

(51) Int. Cl.
*G06F 9/48* (2006.01)
*G06F 1/329* (2019.01)
*G06F 9/50* (2006.01)
*G06F 15/16* (2006.01)

(52) U.S. Cl.
CPC ............ *G06F 9/4893* (2013.01); *G06F 1/329* (2013.01); *G06F 9/505* (2013.01); *G06F 15/161* (2013.01)

(58) Field of Classification Search
CPC ...... G06F 1/329; G06F 15/161; G06F 9/4893; G06F 9/505
See application file for complete search history.

(56) References Cited

U.S. PATENT DOCUMENTS

| | | | |
|---|---|---|---|
| 8,266,393 B2 * | 9/2012 | Moscibrod | G06F 13/1652 711/154 |
| 9,026,814 B2 | 5/2015 | Aasheim | |
| 9,207,994 B2 | 12/2015 | Seshadri | |
| 9,268,611 B2 | 2/2016 | Iyer et al. | |
| 9,372,524 B2 * | 6/2016 | Sistla | G06F 1/3228 |
| 9,641,431 B1 * | 5/2017 | Fellows | H04L 45/46 |

(Continued)

OTHER PUBLICATIONS

King et al. "Very highly overarmed waveguides." Proceedings of the IEEE 52.2 (1964): 198-199. (Year: 1964).*

(Continued)

*Primary Examiner* — Meng Ai T An
*Assistant Examiner* — Willy W Huaracha
(74) *Attorney, Agent, or Firm* — Tong J. Lee

(57) ABSTRACT

A multi-processor system includes multiple processors arranged in multiple clusters. Different clusters have different power and performance characteristics. The system includes a task scheduler to schedule tasks to the processors. The task scheduler, in response to detection of a scheduling event trigger, is operative to identify a scheduling objective between a first objective of energy optimization and a second objective of load balance. The scheduling objective is identified based on at least respective operating frequencies and loading of all processors in a highest-capacity cluster of the multiple clusters. According to the identified scheduling objective, the task scheduler schedules a given task to a processor selected among the processors in the multiple clusters.

12 Claims, 6 Drawing Sheets

(56) References Cited

U.S. PATENT DOCUMENTS

| | | |
|---|---|---|
| 10,031,573 B2 | 7/2018 | Chen et al. |
| 10,044,640 B1* | 8/2018 | Levine .................. H04L 47/827 |
| 2009/0106571 A1* | 4/2009 | Low ...................... G06F 9/4856 |
| | | 713/310 |
| 2013/0212417 A1* | 8/2013 | Frid ...................... G06F 1/3203 |
| | | 713/323 |
| 2014/0082626 A1* | 3/2014 | Busaba ................ G06F 9/4881 |
| | | 718/104 |
| 2014/0095904 A1* | 4/2014 | Ananthakrishnan ......................... |
| | | G06F 1/3206 |
| | | 713/320 |
| 2014/0143790 A1* | 5/2014 | Kurihara ............... G06F 9/4837 |
| | | 718/105 |
| 2015/0192979 A1 | 7/2015 | Ghose |
| 2016/0139964 A1* | 5/2016 | Chen ..................... G06F 1/3206 |
| | | 718/104 |
| 2017/0024316 A1 | 1/2017 | Park et al. |
| 2018/0316749 A1* | 11/2018 | Sah ....................... G06F 9/5083 |

OTHER PUBLICATIONS

Melo et al. "Virtual Network Mapping—An Optimization Problem". 2009, pp. 1-15 (Year: 2009).*

* cited by examiner

SWITCH POLICY FOR HYBRID SCHEDULING IN MULTI-PROCESSOR SYSTEMS

CROSS-REFERENCE TO RELATED APPLICATIONS

This application claims the benefit of U.S. Provisional Application No. 62/580,502 filed on Nov. 2, 2017, the entirety of which is incorporated by reference herein.

TECHNICAL FIELD

Embodiments of the invention relate to controlling and optimizing performance and power of multi-processor computing systems.

BACKGROUND

Many modern computing systems implement dynamic voltage and frequency scaling (DVFS), which is a technique that automatically adjusts the frequency and voltage of a processor at runtime. An increase in the operating frequency and voltage of a processor can ramp up computing performance, but also increase power consumption. In some systems, DVFS can coordinate with task scheduling such that the operating frequency of a processor is adjusted when tasks are placed on or removed from the processor. A scheduler that takes power consumption into account when scheduling tasks is an energy-aware scheduler.

Energy-aware scheduling (EAS) is a task scheduling technique for a computing system to optimize power consumption for task placement decisions. A scheduler that performs energy-aware scheduling typically places tasks on a subset of processors and keeps other processors in the system idle to save power. However, aggregating task placement on a few processors is counter to load balancing which spreads the workload among processors to improve performance.

Thus, there is a need for a computing system to manage the tradeoff between performance and power consumption with respect to task scheduling.

SUMMARY

In one embodiment, a system is provided. The system includes a plurality of processors arranged in multiple clusters, with different clusters having different power and performance characteristics. The system includes a task scheduler to schedule tasks to the processors. The task scheduler, in response to detection of a scheduling event trigger, is operative to identify a scheduling objective between a first objective of energy optimization and a second objective of load balance based on at least respective operating frequencies and loading of all processors in a highest-capacity cluster of the multiple clusters. According to the identified scheduling objective, the task scheduler is operative to schedule a given task to a processor selected among the processors in the multiple clusters.

In another embodiment, a method is provided for task scheduling in a multi-processor system. The method includes: detecting a scheduling event trigger by a task scheduler which is to schedule tasks to processors arranged in multiple clusters, with different clusters having different power and performance characteristics; identifying a scheduling objective between a first objective of energy optimization and a second objective of load balance based on at least respective operating frequencies and loading of all processors in a highest-capacity cluster of the multiple clusters; and scheduling a given task to a processor selected among the processors in the multiple clusters according to the identified scheduling objective.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a runtime mechanism for a multi-processor system to determine a task scheduling objective among alternative scheduling objectives. For example, one scheduling objective may be to minimize energy consumption, and another scheduling objective may be to balance the workload among the processors. In one embodiment, the system uses energy-aware scheduling as the default scheduling with an objective to optimize energy consumption. The system is provided with a switch policy which defines two switch conditions. When either one of two switch conditions is detected or evaluated to be true, the system switches from energy-aware scheduling to capacity-aware scheduling with an objective to balance the workload. When neither of the switch conditions is detected or evaluated to be true, the system uses energy-aware scheduling for task scheduling.

In one embodiment, processors in different clusters have different power and performance characteristics, while processors in the same cluster have the same power and performance characteristics. In one embodiment, the switch policy may define a first switch condition as "when the sum of consumed capacity of all processors in the highest-capacity cluster exceeds a total capacity threshold," and a second switch condition as "when the consumed capacity of at least one processor in the other cluster(s) exceeds a capacity threshold." In one embodiment, different clusters have different capacity thresholds. The definition of the capacity threshold will be described in detail later.

In some systems, a "processor" may be a central processing unit (CPU), a digital signal processor (DSP), a multimedia processor, a graphics processing unit (GPU), a vector processor, or other general purpose or special purpose processing circuitry. In some systems, a processor may be the same as a "core" or "processor core," while in some other systems a processor may include multiple cores. It is understood that the switch policy described herein is applicable to any type of processors arranged in multiple clusters.

Figure 1:
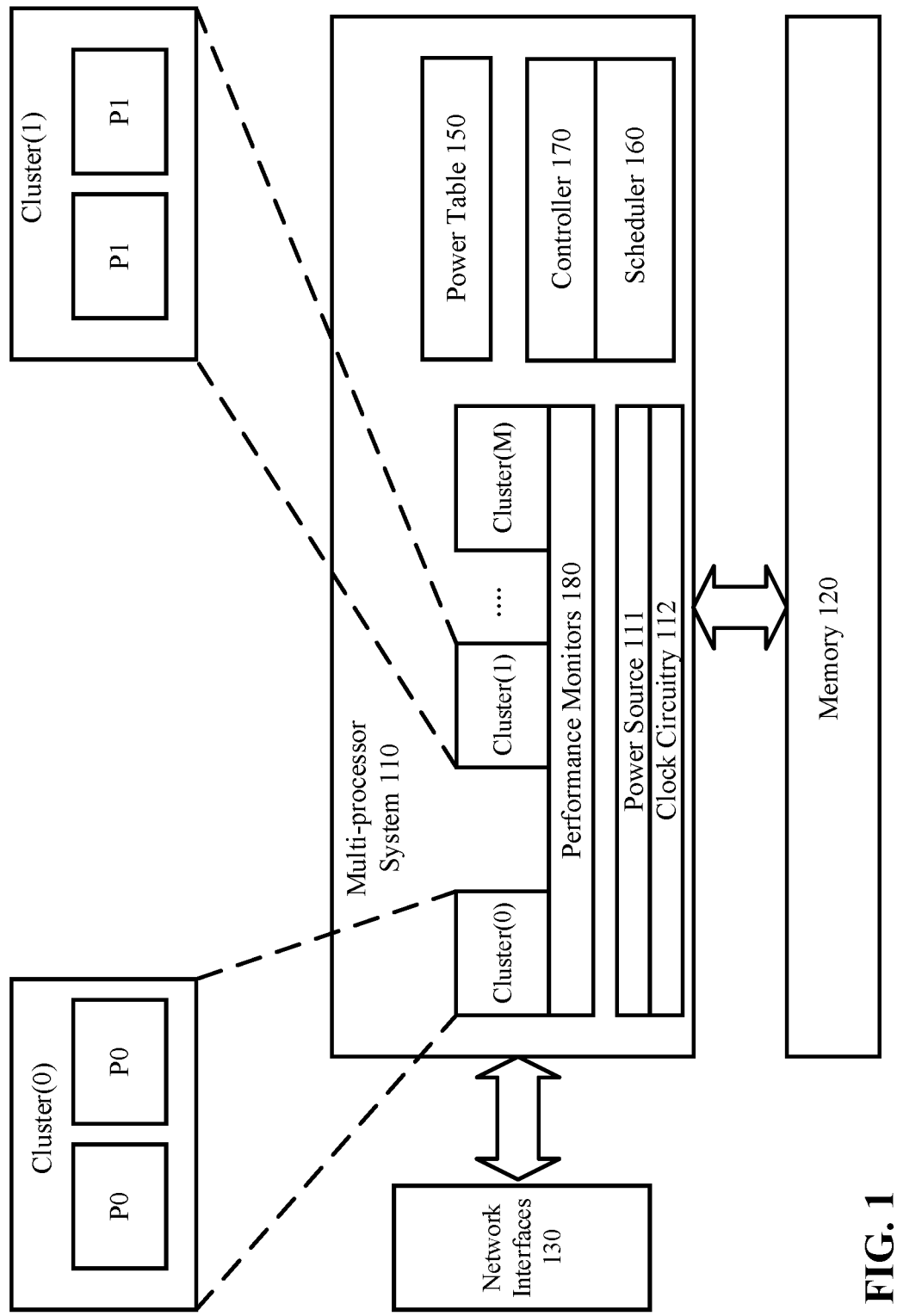
FIG. 1 illustrates a multi-processor system according to one embodiment.

FIG. 1 illustrates an example of a multi-processor system 110 according to one embodiment. The multi-processor system 110 includes two or more types of processors arranged in two or more clusters (e.g., Cluster(0), Cluster(1), . . . , Cluster(M)), where M may be any positive integer. Although two processors are shown in each of Cluster(0) and Cluster(1), each cluster may include more than two processors and different clusters may include a different number of processors. In one embodiment, the multi-processors system 110 is a system-on-a-chip (SOC).

In one embodiment, processors in the same cluster have the same processor type, and processors in different clusters have different processor types. Processors of different processor types have different hardware characteristics which may be measured by their capacities (e.g., measured by million instructions per second (MIPS)) and/or energy efficiency (e.g., measured by power consumption). The processors of different processor types share the same instruction set architecture (ISA); that is, they can execute the same programs and software applications. In one embodiment, the processors of different processor types may have different microarchitecture to deliver different compute performance and different power efficiency.

In the embodiment of FIG. 1, each cluster has access to a memory 120. The memory 120 may include on-chip and off-chip memory devices such as dynamic random access memory (DRAM), static RAM (SRAM), flash memory and other volatile or non-volatile memory devices. Each cluster receives power from a power source 111 and clock signals from clock circuitry 112. In one embodiment, the multi-processor system 110 is coupled to network interfaces 130 to connect to networks (e.g., a personal area network, a local area network, a wide area network, etc.). It is understood the embodiment of FIG. 1 is simplified for illustration purposes. Additional hardware components may be included.

In one embodiment, the multi-processor system 110 includes a controller 170 to control the power and performance of the multi-processor system 110 to satisfy system performance requirements and power budget. The controller 170 may dynamically manage the power and performance by determining the number of processors to turn on (i.e., activated) and by controlling the operating point (e.g., the frequency and the voltage) of the activated processors.

In one embodiment, the multi-processor system 110 includes a set of performance monitors 180 (e.g., sensors and counters) to monitor power consumption and performance of each processor (e.g., processing time, utilization, operating frequency, voltage, temperatures, etc.) at runtime. According to the output of the performance monitors 180, the controller 170 may adjust the voltage and operating frequency of each processor based on the output of the performance monitors 180. In one embodiment, the controller 170 may further adjust the voltage and operating frequency of each processor based on the types of instructions executed by the processor. As will be described later in connection with FIG. 5, a power table 150 may record the relationship between the power and performance for each processor (or processor type). In one embodiment, the power table 150 may include, for each processor, performance indices and power indices which indicate the power vs. performance relation of each operating point of the processor. The power table 150 may be used by the controller 170 for choosing which processors to activate and the most energy efficient operating point for the activated processors. The controller 170 then configures the power source 111 (e.g., voltage regulators) and the clock circuitry 112 to provide the selected operating point to each activated processor.

In one embodiment, the multi-processor system 110 also includes a scheduler 160 (also referred to as a task scheduler) which assigns and schedules tasks among the processors. The scheduler 160 is responsible for task placement every time there is a new task, wake-up task, or otherwise not yet scheduled task waiting to be scheduled. The scheduler 160 determines on which processor to place the task. The scheduler 160 may also be responsible for load balancing operations. In some embodiments, the load balancing operations are periodic operations for balancing the workload among all processors or activated processors in the multi-processor system 110.

In one embodiment, the scheduler 160 keeps track of the loading (i.e., utilization) of each processor based on the output of the performance monitors 180. The scheduler 160 compares the consumed capacity of a processor (or processors) with a capacity threshold to determine whether the switch policy should be invoked (i.e., whether to switch the objective of task scheduling). The consumed capacity of a processor is defined with respect to the loading and the operating frequency of the processor. The loading of a processor indicates the amount of work performed by the processor within a given period of time (e.g., a 60% loading indicates that the processor's cycles are 60% utilized to perform work). The consumed capacity of a processor may be calculated from multiplying the operating frequency of the processor by the loading of the processor. Thus, a processor operating at a higher frequency has a higher consumed capacity than the processor, with the same loading, operating at a lower frequency.

In one embodiment, the capacity threshold of a processor may be set at 80% loading at a predetermined operating frequency of the processor in the multi-processor system 110. If at the time of the capacity comparison the processor is not operating at that predetermined frequency, its capacity may be normalized to that predetermined frequency; e.g., 90% loading at 1 GHz is normalized to 45% loading at 2 GHz. In some embodiments, the capacity threshold may be represented by an integer, a fraction, or another data representation, which is calculated from multiplying a predetermined operating frequency of a processor by a predetermined loading of the processor. Thus, the capacity comparison is based on not only the processor's loading, but also the processor's operating frequency at the time of comparison.

The scheduler 160 determines which scheduling objective to apply according to the result of the capacity comparison. The scheduler 160 then schedules waiting tasks (e.g., newly assigned tasks, tasks awakened from sleep or idleness, tasks waiting in a queue, etc.) accordingly. According to the scheduling objective, the scheduler 160 may also periodically determine whether to perform or to skip load balancing operations. For example, when the scheduler 160 is triggered to perform load balancing operations, if the scheduling objective at the time is to optimize energy consumption, the scheduler 160 may skip the load balancing operations.

Although the scheduler 160 is shown as a module outside the processors, in one embodiment the scheduler 160 includes software components executed by the processors. In some embodiments, the scheduler 160 is part of the operating system (OS) kernel executed by one or more of the processors.

Figure 2:
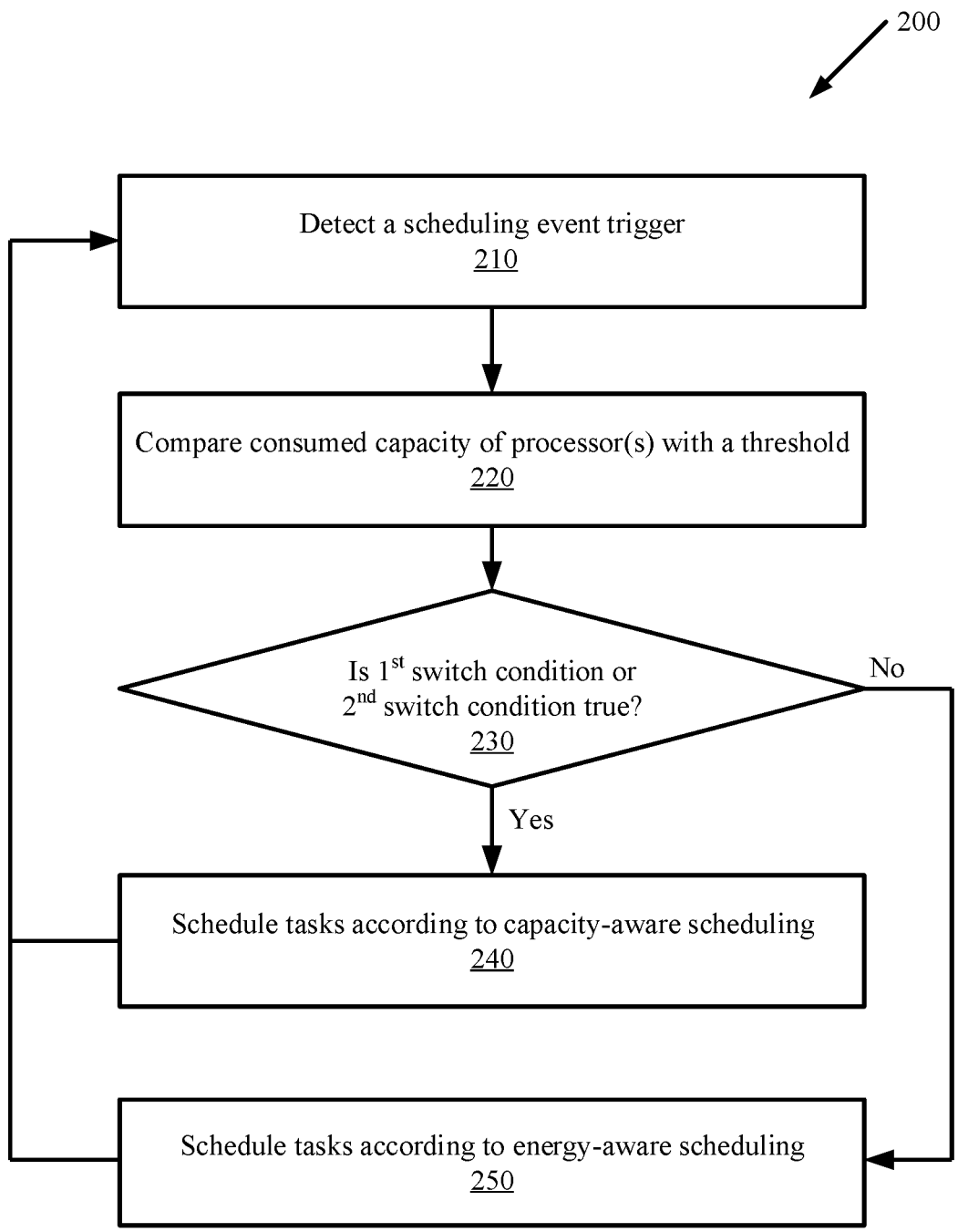
FIG. 2 is a flow diagram illustrating an overview of a switch policy for determining a scheduling objective according to one embodiment.

FIG. 2 is a flow diagram 200 illustrating an overview of a switch policy used by a system, such as the multiprocessor system 100 according to one embodiment. At step 210, the system detects a scheduling event trigger, which can be a request for scheduling a task or a load balancing operation. The system compares loading of the processors with their respective capacity thresholds at step 220. The system may receive the loading information and the operating frequency of each processor from performance monitors (e.g., the performance monitors 180 of FIG. 1). The comparison results are used to determine whether the first switch condition (whether the sum of consumed capacity of all processors in the highest-capacity cluster exceeds a total capacity threshold of the highest-capacity cluster) or the second switch condition (whether the consumed capacity of any processor in any of the other clusters exceeds its capacity threshold of that cluster) is true at step 230. If either the first switch condition or the second switch condition is true (which includes the scenario where both the first switch condition and the second switch condition are true), the system switches to capacity-aware scheduling at step 240 for task scheduling. If neither condition is true, the system uses energy-aware scheduling at step 250 for task scheduling. The operations of steps 210-250 repeat when another scheduling event trigger is detected.

Figure 3A:
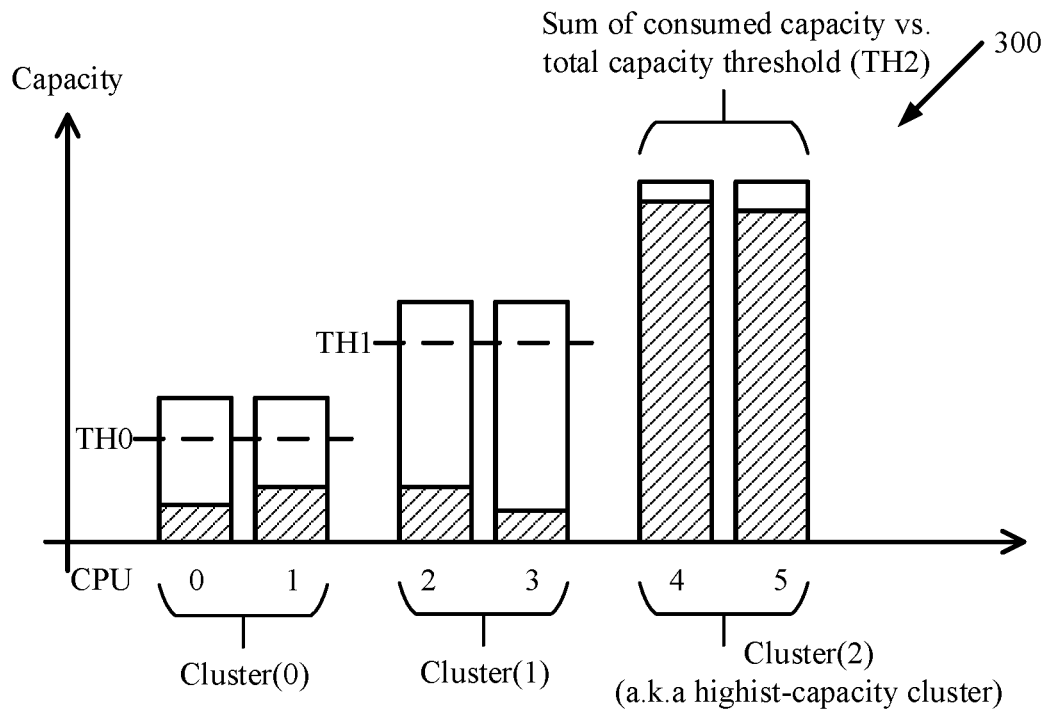
FIG. 3A illustrates a first switch condition defined in a switch policy according to one embodiment.

FIG. 3A is a diagram 300 illustrating the first condition mentioned at step 230 of FIG. 2 according to one embodiment. This example shows three clusters with each cluster having two CPUs. Cluster(2) is the highest-capacity cluster. The capacity of each CPU is represented by the height of the corresponding rectangular bar. The capacity may be measured by MIPS or other performance measurement metrics. The consumed capacity of a CPU is represented by the patterned fill in the corresponding rectangular bar. For a cluster that is not the highest-capacity cluster (e.g., Cluster (0) or Cluster(1)), processors in the same cluster have the same capacity threshold (e.g., TH0 or TH1), and processors in different clusters have different capacity thresholds. For the highest-capacity cluster, the sum of consumed capacity of all processors in the highest-capacity cluster is compared with the total capacity threshold (TH2).

When the sum of the consumed capacity of all processors in the highest-capacity cluster exceeds the total capacity threshold, the scheduling objective is switched from the default energy optimization (i.e., energy-aware scheduling) to load balance (i.e., capacity-aware scheduling). In one embodiment, when a scheduler receives a request or detects a trigger for load balance operations, the consumed capacity of the processors is checked. In FIG. 3A, when the sum of the consumed capacity of the highest-capacity cluster is greater than the total capacity threshold (TH2), the scheduler may attempt to move the workload from CPU_4 and CPU_5 to the other processors (if the workload on either processor can be partitioned and migrated) according to the load balancing objective. If there is a task waiting to be placed, the scheduler will place the task according to the loading balancing objective.

Figure 3B:
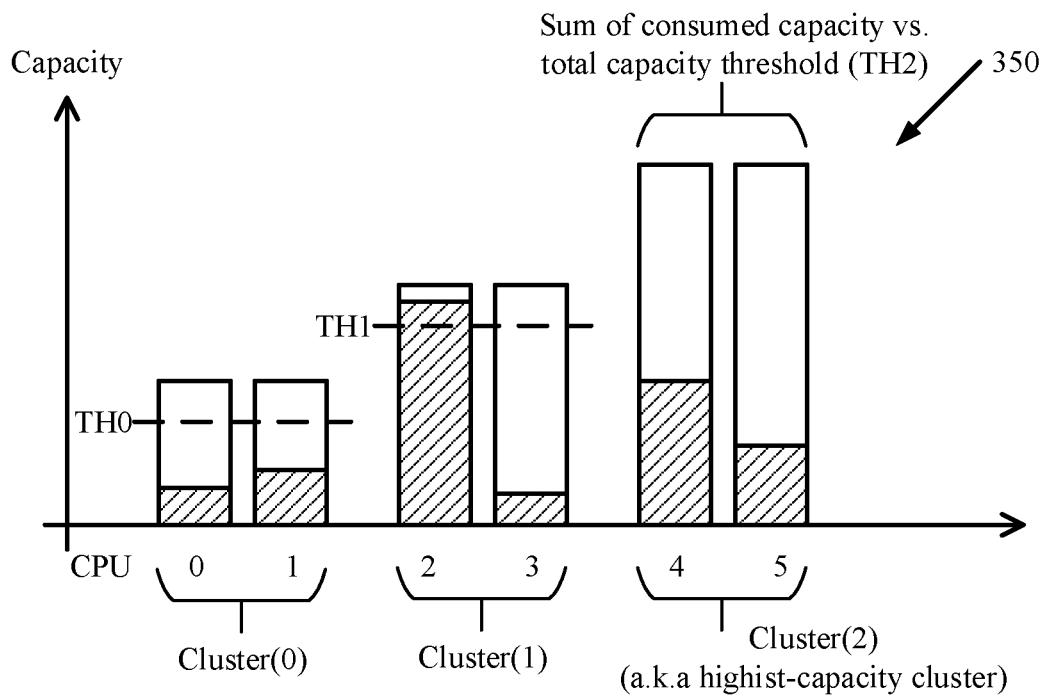
FIG. 3B illustrates a second switch condition defined in a switch policy according to one embodiment.

FIG. 3B is a diagram 350 illustrating the second condition mentioned at step 230 of FIG. 2 according to one embodiment. This example shows the same three clusters as in FIG. 3A. The diagram 350 also shows that the loading of CPU_2 in Cluster(1) exceeds its capacity threshold (TH1). When the consumed capacity of any processor that is not in the highest-capacity cluster exceeds its capacity threshold, the scheduling objective is switched from the default energy optimization (i.e., energy-aware scheduling) to load balance (i.e., capacity-aware scheduling). In one embodiment, when a scheduler receives a request or a trigger for load balance operations, the loading of the processors is checked. If the loading of any processor not in the highest-capacity cluster is as shown in FIG. 3B, the scheduler may attempt to move the workload from CPU_2 to the other processors (if the workload on CPU_2 can be partitioned and migrated) according to the load balancing objective. If there is a task waiting to be placed, the scheduler will place the task according to the loading balancing objective.

The first switch condition and the second switch condition may be evaluated in parallel or in any order when the scheduler 160 detects or receives a scheduling event trigger. When neither the first condition nor the second condition is evaluated to be true, the scheduler 160 schedules tasks according to the energy-aware objective to optimize energy consumption (i.e., to reduce or minimize power consumption).

As shown in the examples of FIG. 3A and FIG. 3B, the capacity threshold is different from one cluster to another. The capacity threshold of each cluster may be set at a value calculated from multiplying a predetermined loading level of the cluster with a predetermined frequency. In one embodiment, the predetermined frequency is a turning-point frequency of the cluster when the cluster is not the highest-capacity cluster. The turning-point frequency may be the sweet-point frequency or the maximum operating frequency of the cluster. The turning-point frequency of a cluster (i.e., any processor in the cluster) may be determined from the power and performance curve of the processor.

Figure 4:
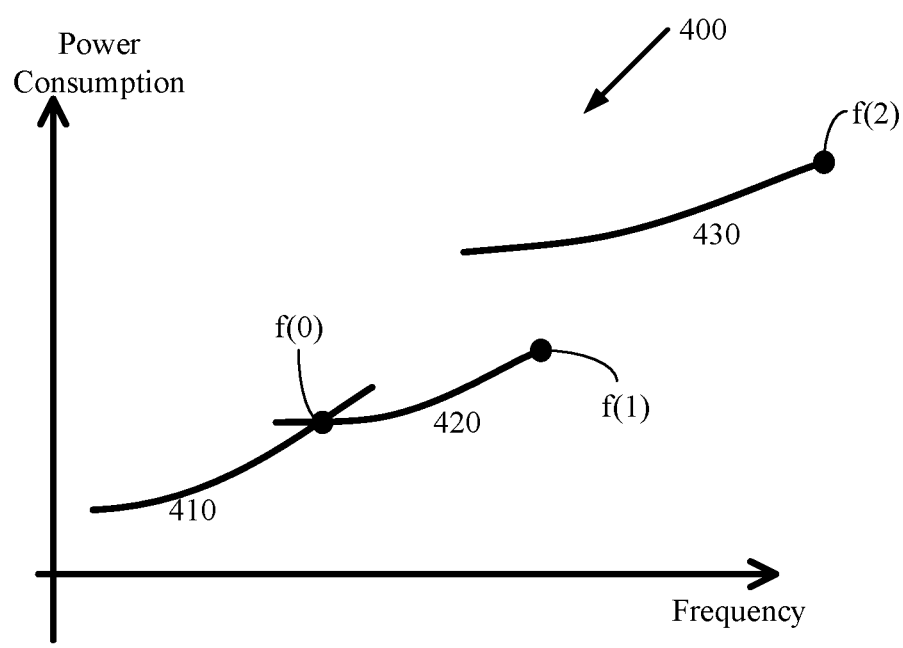
FIG. 4 illustrates examples of turning-point frequencies according to one embodiment.

FIG. 4 is a diagram 400 illustrating examples of turning-point frequencies according to one embodiment. The vertical axis is the power consumption (which is also referred to as energy consumption) and the horizontal axis is the frequency. Diagram 400 includes three curves 410, 420 and 430, representing the power vs. frequency characteristics of the processors in Cluster(0), Cluster(1) and Cluster(2), respectively. It is noted that the power vs. frequency characteristics of a processor is also referred to as the power vs. performance characteristics, since the frequency at which a processor operates is directly proportional to the performance of the processor. The operating points of a processor in a cluster are defined on the corresponding curve (e.g., curve 410 for Cluster(0)). Curves that occupy adjacent frequency regions are referred to as adjacent curves (e.g., curves 410 and 420 are adjacent curves, and curves 420 and 430 are adjacent curves). Diagram 400 shows that curve 410 intersects curve 420, and curve 420 does not intersect curve 430. The intersection frequency point f(0) is called the sweet-point frequency. The sweet-point frequency f(0) represents an upper boundary for the energy-efficient operating frequency range of Cluster(0) and a lower boundary for the energy-efficient operating frequency range of Cluster(1). These boundaries are not hard limits on the operating frequency; e.g., Cluster(0) may also operate above f(0), and Cluster(1) may also operate below f(0). The boundary merely indicates whether a cluster operates within a frequency range that is energy efficient for that cluster. Each sweet-point frequency is associated with two clusters; e.g., f(0) is associated with Cluster(0) and Cluster(1). For frequencies lower than f(0), the energy efficiency of each processor in Cluster(0) is higher than each processor in the Cluster(1). For frequencies higher than f(0), the energy efficiency of each processor in Cluster(0) is lower than each processor in the Cluster(1). For Cluster(0), its turning-point frequency is the sweet-point frequency f(0). Thus, the sweet-point frequency f(0) is an operating frequency above which Cluster(0) is less energy efficient than Cluster(1).

Diagram 400 further illustrates a scenario where curves do not intersect each other. The turning-point frequency in this scenario for Cluster(1) is its maximum operating frequency on curve 420; i.e., f(1). Since Cluster(2) is the highest-capacity cluster and occupies the highest frequency region in diagram 400, its turning-point frequency is its maximum operating frequency on curve 430; i.e., f(2).

Although only three clusters are shown in FIG. 4, it is understood that the aforementioned characteristics are extendable to any number of clusters. Moreover, different clusters may exhibit different characteristics represented by different curves. Some of the adjacent curves may intersect each other, some of the adjacent curves may have no intersections but have overlapping frequency regions, and some of the adjacent curves may have no overlapping frequency region at all. These curves, as well as the operating points on the curves, may be determined by test results and experiments.

Referring back to FIG. 3A and FIG. 3B, in one embodiment the first switch condition and the second switch condition of the switch policy are evaluated when a processor is operating at its turning-point frequency. For example, in FIG. 3B, if CPU_2 is operating at its turning-point frequency (e.g., f(1)) and its loading exceeds a loading threshold, then the second switch condition is evaluated to true and the scheduling is switched to capacity-aware scheduling. It is noted that the loading thresholds of different clusters may have the same value or different values. In one embodiment, the loading of each processor and the loading threshold of that processor may be normalized to a common frequency across the clusters for the purpose of comparison; e.g., the common frequency may be the maximum operating frequency of the highest-capacity cluster (such as f(2) in the example of FIG. 4).

Figure 5:
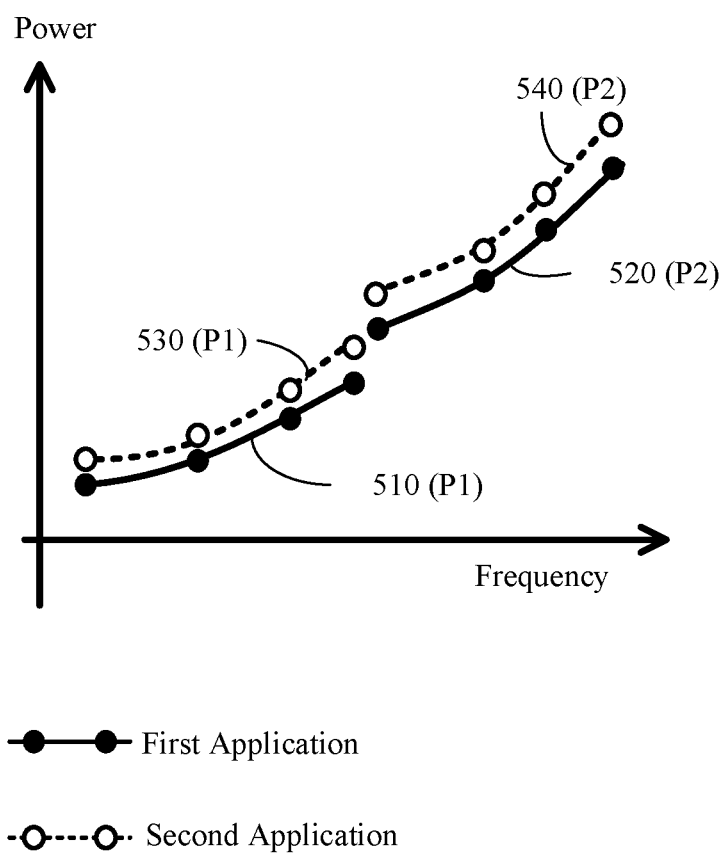
FIG. 5 illustrates a turning point frequency that changes with different instructions executed by a processor according to one embodiment.

In one embodiment, the power vs. frequency curve of each processor may change when the processor executes different types of instructions. FIG. 5 is a diagram illustrating the power vs. frequency curves of two processors P1 and P2 (which are in two different clusters) according to one embodiment. In this example, solid curves 510 and 520 represent the power vs. frequency curves for P1 and P2, respectively, when each processor executes a first application. Dotted curves 530 and 540 represent the power vs. frequency curves for P1 and P2, respectively, when each processor executes a second application. The circles on the curves 510-540 represent the operating points. For P1, each operating point on curve 510 and a corresponding operating point on curve 530 have the same voltage and frequency; e.g., the leftmost operating points on curves 510 and 530 have the same voltage and frequency, the second leftmost operating points on curves 510 and 530 have the same voltage and frequency, and so on. The same applies to the operating points on curves 520 and 540 for P2. FIG. 5 shows that the power vs. frequency curves may be different (e.g., shifted vertically and/or horizontally, different in slopes and/or shapes, etc.) when the same processor executes different applications. The positions of the same operating point on the curves (between a solid curve and a dotted curve of the same processor) may be different for different applications.

In the example of FIG. 5, there may be different characteristics between the two applications executed by P1 and P2 (e.g., a first application represented by the solid curves, and a second application represented by the dotted curves). For example, the first application may contain 40% of integer instructions, 10% of floating point instructions, and 50% of memory access instructions. The second application may contain 30% of integer instructions, 40% of floating point instructions, and 30% of memory access instructions. A different mix of instructions have a different impact on the power and performance of a processor. In one scenario, a processor's capacity threshold or loading threshold may be lowered when it executes an application that incurs higher power consumption. Thus, in one embodiment, the multi-processor system 110 (FIG. 1) may dynamically adjust the capacity thresholds and/or the loading thresholds for a processor according to the different instruction mix executed by the processor to improve runtime energy efficiency and performance. For the highest-capacity cluster, the cluster's total capacity threshold may be adjusted according to a combination of instruction types executed by the processors in the highest-capacity cluster.

Figure 6:
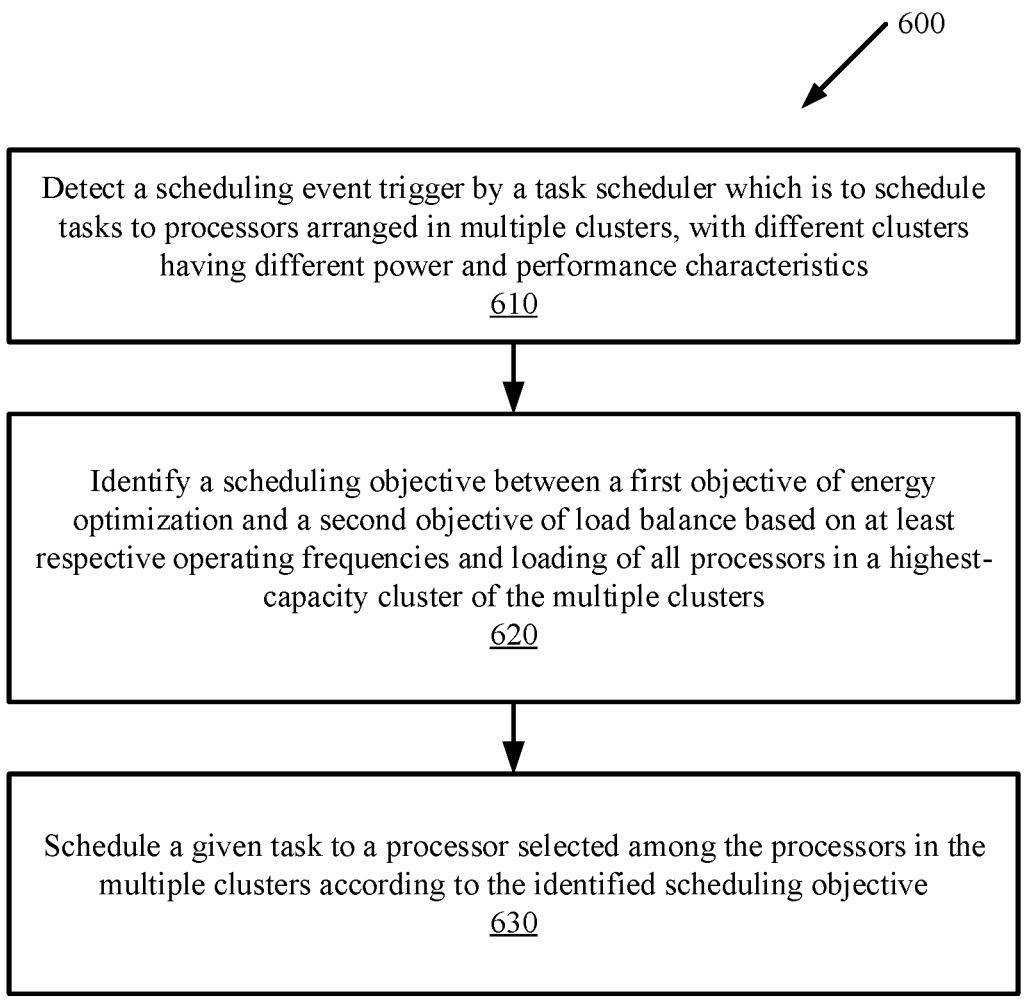
FIG. 6 is a flow diagram illustrating a method for task scheduling in a multi-processor system according to one embodiment.

FIG. 6 is a flow diagram illustrating a method 600 for task scheduling in a multi-processor system according to one embodiment. The method 600 may be performed by the multi-processor system 110 of FIG. 1.

The method 600 begins at step 610 when the system detects a scheduling event trigger by a task scheduler. The task scheduler is to schedule tasks to processors arranged in multiple clusters, with different clusters having different power and performance characteristics. The system at step 620 identifies a scheduling objective between a first objective of energy optimization and a second objective of load balance based on at least respective operating frequencies and loading of all processors in a highest-capacity cluster of the multiple clusters. The system at step 630 schedules a given task to a processor selected among the processors in the multiple clusters according to the identified scheduling objective.

The operations of the flow diagrams of FIGS. 2 and 6 has been described with reference to the exemplary embodiment of FIG. 1. However, it should be understood that the operations of the flow diagrams of FIGS. 2 and 6 can be performed by embodiments of the invention other than the embodiment of FIG. 1, and the embodiment of FIG. 1 can perform operations different than those discussed with reference to the flow diagrams. While the flow diagrams of FIGS. 2 and 6 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A system, comprising:
a plurality of processors arranged in multiple clusters, with different clusters having different power and performance characteristics, wherein the multiple clusters includes a highest-capacity cluster that has highest performance among the multiple clusters; and
memory to store instructions which, when executed by the system, cause the system to perform operations of a task scheduler, wherein, in response to detection of a scheduling event trigger to schedule tasks to the processors in multiple clusters, the task scheduler is operative to:
identify a scheduling objective between a first scheduling objective of energy optimization and a second scheduling objective of load balance based on at least respective operating frequencies and loading of all processors in a highest capacity cluster of the multiple clusters; and
schedule a given task of the tasks to one or more processors in the multiple clusters according to the identified scheduling objective,
wherein, the task scheduler is further operative to:
switch from the second scheduling objective to the first scheduling objective when neither a first condition nor a second condition is true, the first condition being true when a sum of consumed capacity of all processors in the highest-capacity cluster exceeds a total capacity threshold of the highest-capacity cluster, and the second condition being true when consumed capacity of any processor in any given cluster different from the highest-capacity cluster exceeds a per-processor capacity threshold of the given cluster, wherein the consumed capacity of a given processor is calculated based on an operating frequency and loading of the given processor; and
switch from the first scheduling objective to the second scheduling objective when at least one of the first condition and the second condition is true.

2. The system of claim 1, wherein the consumed capacity is a value calculated from a multiplication of the operating frequency and the loading of the given processor.

3. The system of claim 1, wherein the total capacity threshold of the highest-capacity cluster is adjusted according to a combination of instruction types executed by the processors in the highest-capacity cluster.

4. The system of claim 1, the task scheduler is further operative to:
identify the second objective as the scheduling objective when the loading of a processor in a given cluster exceeds a loading threshold and the processor operates at a sweet-point frequency of the given cluster, and wherein the sweet-point frequency is an operating frequency above which the given cluster is less energy efficient than another cluster of the multiple clusters.

5. The system of claim 1, wherein the task scheduler is further operative to:

identify the second objective as the scheduling objective when the loading of a processor in a given cluster exceeds a loading threshold and the processor operates at a maximum frequency of the given cluster, and wherein a power vs. frequency curve of the given cluster has no intersection with corresponding curves of other clusters of the multiple clusters.

6. The system of claim 1, wherein the task scheduler is further operative to: skip a periodic load balancing operation when the first scheduling objective is identified as the scheduling objective.

7. A method for task scheduling in a multi-processor system, comprising:
detecting a scheduling event trigger by a task scheduler which is to schedule tasks to processors arranged in multiple clusters, with different clusters having different power and performance characteristics, wherein the multiple clusters includes a highest-capacity cluster that has highest performance among the multiple clusters;
identifying a scheduling objective between a first scheduling objective of energy optimization and a second scheduling objective of load balance based on at least respective operating frequencies and loading of all processors in a highest capacity cluster of the multiple clusters; and
scheduling a given task of the tasks to one or more processors in the multiple clusters according to the identified scheduling objective,
wherein identifying the scheduling objective further comprises:
switching from the second scheduling objective to the first scheduling objective when neither a first condition nor a second condition is true, the first condition being true when a sum of consumed capacity of all processors in the highest-capacity cluster exceeds a total capacity threshold, and the second condition being true when the consumed capacity of any processor in any given cluster different from the highest capacity cluster exceeds a per-processor capacity threshold of the given cluster, wherein the consumed capacity of a given processor is calculated based on an operating frequency and loading of the given processor; and
switching from the first scheduling objective to the second scheduling objective when at least one of the first condition and the second condition is true.

8. The method of claim 7, wherein the consumed capacity is a value calculated from a multiplication of the operating frequency and the loading.

9. The method of claim 7, wherein the total capacity threshold of the highest-capacity cluster is adjusted according to a combination of instruction types executed by the processors in the highest-capacity cluster.

10. The method of claim 7, wherein identifying the scheduling objective further comprises:
identifying the second scheduling objective as the scheduling objective when the loading of a processor in a given cluster exceeds a loading threshold and the processor operates at a sweet-point frequency of the given cluster, and wherein the sweet-point frequency is an operating frequency above which the given cluster is less energy efficient than another cluster of the multiple clusters.

11. The method of claim 7, wherein identifying the scheduling objective further comprises:

identifying the second scheduling objective as the scheduling objective when the loading of a processor in a given cluster exceeds a loading threshold and the processor operates at a maximum frequency of the given cluster, and wherein a power vs. frequency curve of the given cluster has no intersection with corresponding curves of other clusters of the multiple clusters.

12. The method of claim 7, further comprising:
skipping a periodic load balancing operation when the first scheduling objective is identified as the scheduling objective.

\* \* \* \* \*